(12) United States Patent
Kim et al.

(10) Patent No.: US 7,219,359 B2
(45) Date of Patent: May 15, 2007

(54) ACTUATOR USED WITH AN OPTICAL PICKUP

(75) Inventors: Seok-jung Kim, Gyeonggi-do (KR);
Yong-hoon Lee, Gyeonggi-do (KR);
Sun-mo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/019,992

(22) Filed: Dec. 23, 2004

(65) Prior Publication Data
US 2005/0105408 A1    May 19, 2005

Related U.S. Application Data

(63) Continuation of application No. 10/247,794, filed on Sep. 20, 2002, now Pat. No. 6,895,593.

(30) Foreign Application Priority Data
Dec. 1, 2001    (KR) ................... 2001-75671

(51) Int. Cl.
*G11B 7/12*    (2006.01)
(52) U.S. Cl. .................................... 720/683
(58) Field of Classification Search ........... 720/683, 720/682, 681, 674, 672, 669, 658
See application file for complete search history.

(56) References Cited

U.S. PATENT DOCUMENTS

| | | | | |
|---|---|---|---|---|
| 4,842,392 | A | * 6/1989 | Nakamura et al. | 359/814 |
| 5,018,836 | A | * 5/1991 | Noda et al. | 359/814 |
| 5,729,510 | A | 3/1998 | Kasahara et al. | 369/44.14 |
| 5,864,524 | A | 1/1999 | Sakaguchi | 369/44.21 |
| 5,999,507 | A | 12/1999 | Yoshizawa | 369/53.25 |
| 6,021,107 | A | 2/2000 | Tsukahara et al. | 720/669 |

(Continued)

FOREIGN PATENT DOCUMENTS

CN    1115673 C    7/2003

(Continued)

OTHER PUBLICATIONS

European Search Report dated May 13, 2005, issued in corresponding European Patent Application No. 05007845.0.

(Continued)

*Primary Examiner*—Julie Anne Watko
(74) *Attorney, Agent, or Firm*—Stein, McEwen & Bui, LLP

(57) ABSTRACT

An actuator for an optical pickup having a base on which a holder is fixed, a bobbin, a support member, and a magnetic circuit. Pluralities of installation holes are formed in the bobbin such that a plurality of objective lenses to record and/or reproduce optical discs having different recording densities are installed at different heights. The support member has one end coupled to the bobbin and the other end coupled to the holder movably supports the bobbin. The magnetic circuit drives the bobbin in focusing and tracking directions. The magnetic circuit is divided into a first magnetic circuit to drive the objective lenses in the focusing direction, and a second magnetic circuit to drive the objective lenses in the tracking direction, thereby reducing the weight of a moving portion.

14 Claims, 6 Drawing Sheets

U.S. PATENT DOCUMENTS 6,449,235 B1 * 9/2002 Kim et al. ............. 369/112.01

FOREIGN PATENT DOCUMENTS

| EP | 777222 A1 | 6/1997 |
| --- | --- | --- |
| EP | 910074 A2 | 4/1999 |
| EP | 1111603 A1 | 6/2001 |
| JP | 6-333255 | 12/1994 |
| JP | 9-297927 | 11/1997 |
| JP | 10-106001 | 4/1998 |
| JP | 10-124894 | 5/1998 |
| JP | 11-328719 | 11/1999 |
| JP | 2001-23200 A * | 1/2001 |
| JP | 2001-118265 | 4/2001 |
| JP | 2001-167458 | 6/2001 |
| JP | 10-116428 A * | 8/2006 |

OTHER PUBLICATIONS

Chinese Office Action dated Apr. 30, 2004 in Chinese Application No. 2131575.2.

* cited by examiner

ACTUATOR USED WITH AN OPTICAL PICKUP

CROSS-REFERENCE TO RELATED APPLICATIONS

This application is a continuation of prior U.S. patent application Ser. No. 10/247,794 filed on Sep. 20, 2002 now U.S. Pat. No. 6,895,593 in the U.S. patent and Trademark Office. This application claims the benefit of Korean Application No. 2001-75671, filed Dec. 1, 2001, in the Korean Industrial Property Office, the disclosure of which is incorporated herein by reference.

BACKGROUND OF THE INVENTION

1. Field of the Invention

The present invention relates to an actuator used with an optical pickup, and more particularly, to an actuator used with an optical pickup having a plurality of objective lenses so that a plurality of optical discs having different recording densities can be recorded and/or reproduced.

2. Description of the Related Art

It is well-known that digital versatile discs (DVDs) are recorded and/or reproduced using light having a wavelength of 650 nm (or 635 nm) and using an objective lens having a numeral aperture of 0.6 (0.65 in the case of a recordable disc). In the case of DVDs having a diameter of 120 mm and a track pitch of 0.74 μm, DVDs have a capacity of 4.7 or more gigabytes for a single surface. Accordingly, DVDs are not suitable for a recording medium on which high definition (HD) moving picture information is to be recorded. This is the reason that a recording capacity of 23 or more gigabytes for a single surface is required so that 135-minute HD moving picture information can be recorded on the recording medium.

To meet the need of a high density recording capacity, high density optical discs, i.e., next generation DVDs (hereinafter, high definition-digital versatile discs (HD-DVDs)) using light having a wavelength shorter than that of a red color, i.e., blue light, and an objective lens having a numerical aperture greater than 0.6 and having a more narrow track have been developed and standardized.

In order to obtain an adequate tolerance with respect to tilt of optical discs, as the numerical aperture of an objective lens increases for high density, the thickness of optical discs should be reduced. Considering allowable tolerance with respect to the tilt of optical discs, the 1.2 mm thickness of compact discs (CDs) is reduced to 0.6 mm for DVDs, and there are further possibilities that the thickness of HD-DVDs can be reduced to 0.1 mm. Regarding the numerical aperture of an objective lens, the 0.45 numerical aperture of CDs is increased to 0.6 for DVDs, and there are further possibilities that the numerical aperture for HD-DVDs can be increased to 0.85. Also, considering a recording capacity, there are good possibilities of adopting a light source such as a celadon light source for HD-DVDs. In the development of optical discs with new specifications, compatibility with existing optical discs is important.

However, a special technique is required to design and manufacture an objective lens having a high numerical aperture of about 0.85 as a single lens. Besides, it is difficult to make the working distance of an objective lens having a high numerical aperture be as long as that of an objective lens for DVDs.

Accordingly, to solve the working distance problem, in a compatible optical pickup in which optical discs having high densities can be recorded and/or reproduced, at least one objective lens used to record and/or reproduce CDs and/or DVDs, and an objective lens for high density recording having a higher numerical aperture than the previous objective lens should be separately provided.

For driving in both directions, i.e., a focusing direction and a tracking direction, an actuator for an optical pickup has a magnetic circuit. The actuator maintains an interval between an optical disc and an objective lens in the focusing direction and moves the objective lens in a desired track position (center of a track). As described above, however, the above-mentioned optical pickup adopting a plurality of optical discs having different recording densities requires objective lenses corresponding to the plurality of optical discs having different recording densities, and thus an actuator used with an optical pickup having a plurality of objective lenses loads a plurality of objective lenses on a moving portion so as to move in the focusing and tracking directions.

Referring to FIG. 1, an actuator disclosed in Japanese Patent Publication No. Hei 10-106001 includes a lens holder (bobbin: 7) at which two objective lenses 2 and 3 are installed, a rotation axis 1 which rotatively guides the lens holder 7, and a magnetic circuit which drives the objective lenses 2 and 3 in focusing and tracking directions.

The two objective lenses 2 and 3 are arranged at a predetermined angle θ with respect to the center of the rotation axis 1 and rotate simultaneously at the predetermined angle θ with respect to the rotation axis 1.

The magnetic circuit comprises focusing and tracking coils 8 and 9 installed at the lens holder 7, yokes 5a and 5b, and a plurality of magnets 6. The plurality of magnets 6 are arranged at an angle greater than the predetermined angle of the objective lenses 2 and 3 with respect to the rotation axis 1. The tracking coil 9 is provided to correspond to the magnets 6.

In a conventional actuator having the above structure as illustrated in FIG. 1, the two objective lenses 2 and 3, arranged at the predetermined angle θ with respect to the rotation axis 1 within one lens holder 7, rotates simultaneously by the predetermined angle θ with the respect to the rotation axis 1 such that a plurality of optical discs having different recording densities and thicknesses can be recorded and/or reproduced. Detailed descriptions of the conventional actuator illustrated in FIG. 1 and disclosed in Japanese Patent Publication No. Hei 10-106001 will be omitted.

Since the above conventional actuator requires a complicated magnetic circuit to control the positions of the objective lenses 2 and 3 before and after the objective lenses 2 and 3 rotate simultaneously by the predetermined angel θ with respect to the rotation axis 1, and an additional structure in which the objective lenses 2 and 3 rotate simultaneously by the predetermined angel θ with respect to the rotation axis 1, the entire structure of the conventional actuator is complicated.

Since the above conventional actuator presents an axis perturbation type design, sensitivity is relatively low and non-linear properties are relatively large, the above conventional actuator is less suitable to record and/or reproduce high density optical discs than DVDs.

Moreover, in the above conventional actuator, compared to the structure of an existing actuator in which one objective lens is installed in a bobbin, the moving portion of the above conventional actuator is large, and heavier, and thus the actuator sensitivity is further degraded.

SUMMARY OF THE INVENTION

Accordingly, it is an object of the present invention to provide an actuator used with an optical pickup having an improved structure, more simple than the entire structure of a conventional actuator for an optical pickup, in which two objective lenses are installed in one bobbin, the weight of a moving portion of the actuator is reduced and the actuator sensitivity is improved.

Additional objects and advantages of the invention will be set forth in part in the description which follows and, in part, will be obvious from the description, or may be learned by practice of the invention.

The foregoing and other objects of the present invention are achieved by providing an actuator for an optical pickup including: a base on which a holder is fixed; a bobbin in which a plurality of installation holes are formed such that a plurality of objective lenses to record and/or reproduce optical discs having different recording densities are installed at different heights; a support member, which movably supports the bobbin, having one end coupled to the bobbin and the other end coupled to the holder; and a magnetic circuit which drives the bobbin in focusing and tracking directions.

In an aspect of the present invention, the plurality of installation holes are arranged in a direction corresponding to the direction of a radius of the optical disc.

In another aspect of the present invention, the magnetic circuit is divided into a first magnetic circuit to drive the objective lenses in the focusing direction, and a second magnetic circuit to drive the objective lenses in the tracking direction, thereby reducing the weight of a moving portion of the actuator.

The foregoing and other objects of the present invention may also be achieved by providing an actuator for an optical pickup including: a base on which a holder is fixed; a bobbin in which a plurality of installation holes are formed such that a plurality of objective lenses to record and/or reproduce optical discs having different recording densities are installed; a support member, which movably supports the bobbin, having one end coupled to the bobbin and the other end coupled to the holder; and a magnetic circuit which drives the bobbin in focusing and tracking directions, the magnetic circuit being divided into a first magnetic circuit to drive the objective lenses in the focusing direction, and a second magnetic circuit to drive the objective lenses in the tracking direction, thereby reducing the weight of a moving portion of the actuator.

It is an aspect of the present invention that the plurality of installation holes are provided such that the plurality of objective lenses are installed at different heights. It is another aspect of the present invention that the plurality of installation holes are arranged in a direction corresponding to the direction of a radius of the optical disc. It is yet another aspect of the present invention that the first magnetic circuit includes a focusing coil installed in the bobbin and a focusing magnet installed on the base opposite to the focusing coil, and the second magnetic circuit includes a tracking coil installed in the bobbin and a tracking magnet installed on the base opposite to the tracking coil.

It is yet another aspect of the present invention that the focusing magnet is a two-pole magnetized polarization magnet, the poles being disposed in the focusing direction, and the focusing coil is provided to correspond to the focusing magnet.

Alternatively, wherein the tracking magnet is a three-pole magnetized polarization magnet, the poles are disposed in the tracking direction, and two tracking coils are provided to correspond to the tracking magnet.

It is yet another aspect of the present invention that the first and second magnetic circuits are installed at sides of the bobbin parallel with a direction corresponding to the direction of a radius of the optical disc. It is yet another aspect of the present invention that the first magnetic circuit further includes at least one yoke of an internal yoke and an external yoke to guide magnetic flux generated in the focusing magnet. It is yet another aspect of the present invention that the tracking magnet and the tracking coil of the second magnetic circuit are arranged closer to the center of the bobbin than the focusing coil and the focusing magnet of the first magnetic circuit. It is yet another aspect of the present invention that the plurality of installation holes include a first installation hole in which a first objective lens for at least one kind of low density optical disc is installed, and a second installation hole in which a second objective lens for a high density optical disc is installed.

It is yet another aspect of the present invention that the second installation hole is located in a further inside diameter of the optical disc than the first installation hole. It is yet another aspect of the present invention that the low density optical disc is at least one selected from a CD-family optical disc and a DVD-family optical disc, and the high density optical disc has a higher density than the DVD-family optical disc.

It is yet another aspect of the present invention that when a working distance of the first objective lens for a low density optical disc installed in the first installation hole is represented as WD1, and a working distance of the second objective lens for a high density optical disc installed in the second installation hole is represented as WD2, the first and second installation holes should be provided so that the first and second objective lenses can be installed to satisfy the following Equation:

$$WD1 \geq WD2$$

separation distance with respect to optical disc of second objective lens=$WD2+\alpha$ where, $\alpha=|WD1-WD2|\times(0.1\sim1.0)$.

and contact between the second objective lens having a shorter working distance and the optical disc can be prevented when the optical disc is installed and the first objective lens having a longer working distance operates.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE EMBODIMENTS

Figure 1:
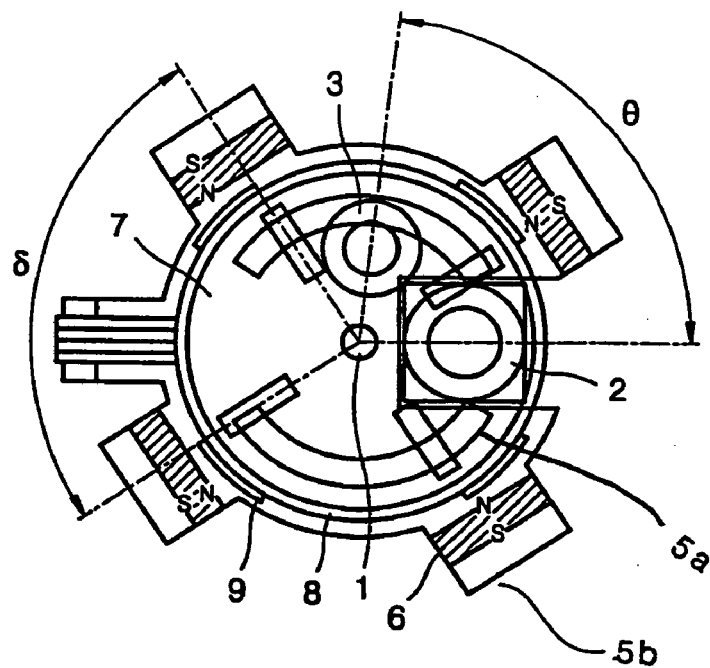
FIG. 1 is a schematic view of a conventional actuator.

Reference will now be made in detail to the embodiments of the present invention, examples of which are illustrated in the accompanying drawings, wherein like reference numerals refer to like elements throughout. The embodiments are described below in order to explain the present invention by referring to the figures.

An actuator used with an optical pickup according to an embodiment of the present invention is a two-axis driving apparatus in which a plurality of objective lenses having different working distances are installed in one bobbin, and a moving portion of the actuator moves independently in focusing and tracking directions. The actuator used with an optical pickup according to an embodiment of the present invention can be adopted in optical pickups to record and/or reproduce two kinds of optical discs, such as HD-DVD and DVD, having different recording densities, or in optical pickups to record and/or reproduce three or more kinds of optical discs, such as HD-DVD, DVD, and CD, having different recording densities.

Figure 2:
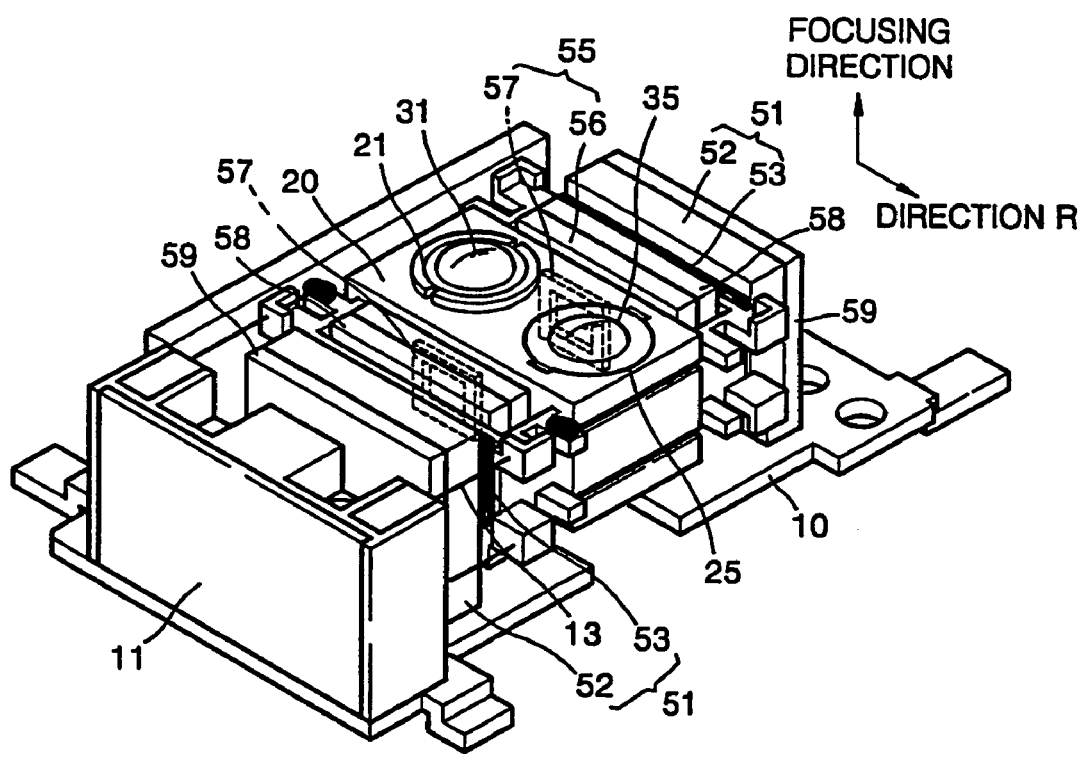
FIG. 2 is a schematic perspective view of the entire structure of an actuator used with an optical pickup according to an embodiment of the present invention.
Figure 3:
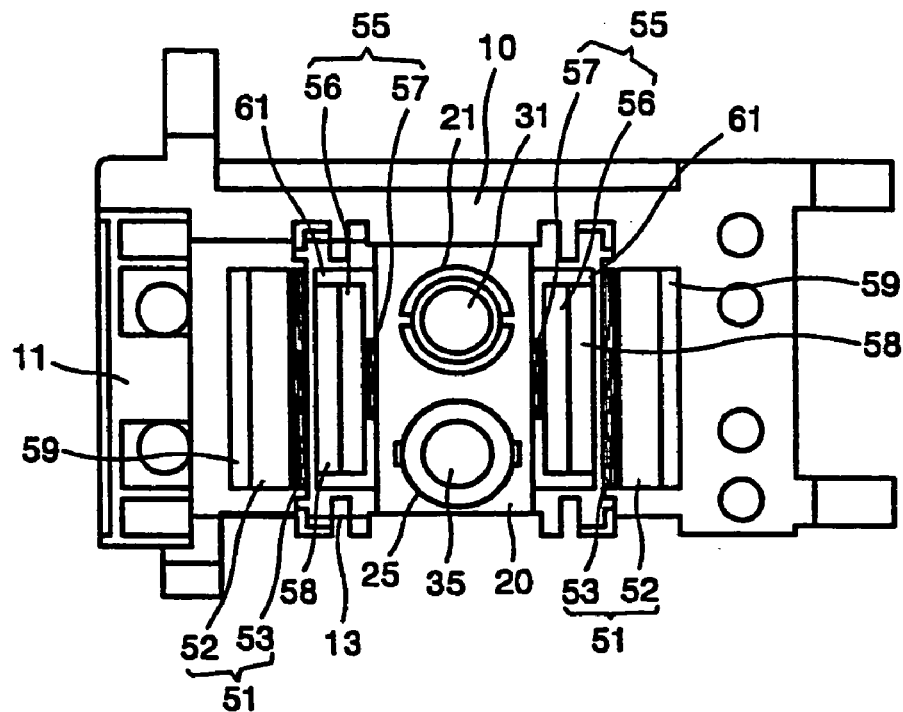
FIG. 3 is a top view of the actuator of FIG. 2.
Figure 4:
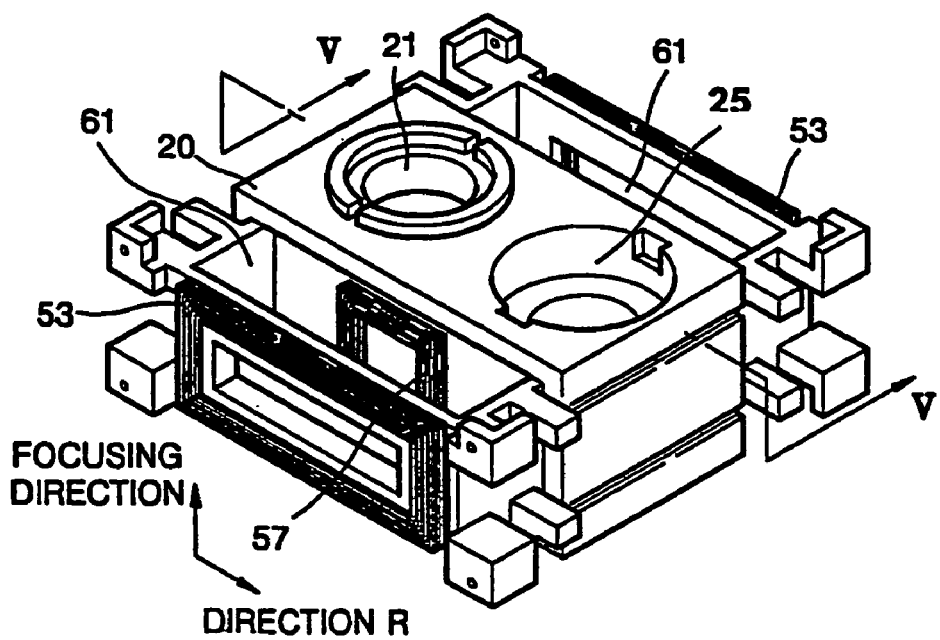
FIG. 4 is a perspective view of the bobbin illustrated in FIG. 2.
Figure 5:
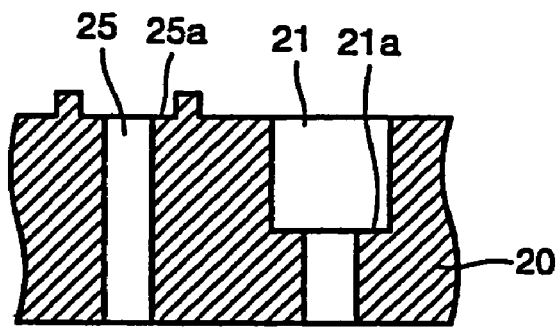
FIG. 5 is a partial cross-sectional view taken along line V—V of FIG. 4.

FIG. 2 is a schematic perspective view of the entire structure of an actuator for an optical pickup according to an embodiment of the present invention, FIG. 3 is a top view of FIG. 2, FIG. 4 is a perspective view of the bobbin illustrated in FIG. 2, and FIG. 5 is a cross-sectional view taken along line V—V of FIG. 4.

Referring to FIGS. 2 through 5, the actuator for an optical pickup according to an embodiment of the present invention includes a base 10 having a holder 11 installed at one side of the base 10, a bobbin 20 on which a plurality of installation holes 21 and 25 are formed so that a plurality of objective lenses 31 and 35 having different working distances are installed on the bobbin 20, a support member 13 (suspension), which movably supports the bobbin 20, having one end coupled to the bobbin 20 and the other end coupled to the holder 11, and a magnetic circuit which drives the bobbin 20 in focusing and tracking directions.

The plurality of objective lenses 31 and 35 includes a first objective lens 31 used to record and/or reproduce at least one kind of low density optical disc having different recording densities, and a second objective lens 35 used to record and/or reproduce higher density optical discs (hereinafter, high density optical discs) than the low density optical discs. The first and second objective lenses 31 and 35 have different working distances. For example, the first objective lens 31 can record and/or reproduce DVD-family optical discs (hereinafter, DVDs), as low density optical discs, and can additionally record and/or reproduce CD-family optical discs (hereinafter, CDs). Also, for example, the second objective lens 35 can record and/or reproduce HD-DVD family optical discs (hereinafter, HD-DVDs) as higher density optical discs than DVDs. Here, the plurality of objective lenses 31 and 35 may comprise three or more objective lenses having different working distances so that the plurality of objective lenses 31 and 35 can be used to record and/or reproduce three or more kinds of optical discs having different recording densities.

The actuator according to an embodiment of the present invention is provided so that the plurality of objective lenses 31 and 35 can be installed in one bobbin 20 in a direction (R direction) corresponding to the direction of a radius of an optical disc, and the actuator can be compatible with an optical pickup which requires a plurality of objective lenses. This is the reason that the optical pickup records and/or reproduces an information signal while moving in the direction of the radius of the optical disc in an optical disc drive.

The actuator used with an optical pickup according to an embodiment of the present invention is provided so that the second objective lens 35 for a high density optical disc is installed in a more inner diameter of the optical disc than the first objective lens 31 for a low density optical disc. This is the reason that a region in which data recording and/or reproduction of an HD-DVD starts in a more inner diameter location than a region in which data recording and/or reproduction of a DVD of a low density optical disc starts.

As described above, when the actuator used with an optical pickup according to an embodiment of the present invention has a structure in which the two objective lenses 31 and 35 are installed in the bobbin 20, as illustrated in FIG. 4, a first installation hole 21 in which the first objective lens 31 is installed, and a second installation hole 25 in which the second objective lens 35 is installed are formed in the bobbin 20. Here, the number of installation holes formed in the bobbin 20 corresponds to the number of objective lenses to be installed.

The first and second installation holes 21 and 25 are arranged in the direction R, as illustrated in FIGS. 4 and 5, and are provided so that the first and second objective lenses 31 and 35 are installed at different heights with respect to each other. Specifically, an installation projection 21a is formed in the first installation hole 21 at a relatively deep position from an upper side opposite to the optical disc of the bobbin 20 such that the first objective lens 31, having a longer working distance for a low density optical disc, can be installed. An installation projection 25a is formed in the second installation hole 25 at the same height as an upper side opposite to the optical disc of the bobbin 20 (or at a position closer to the upper side of the bobbin 20 than the first installation projection 21a formed in the first installation hole 21) such that the second objective lens 35, having a shorter working distance for a high density optical disc, can be installed therein.

Figure 6:
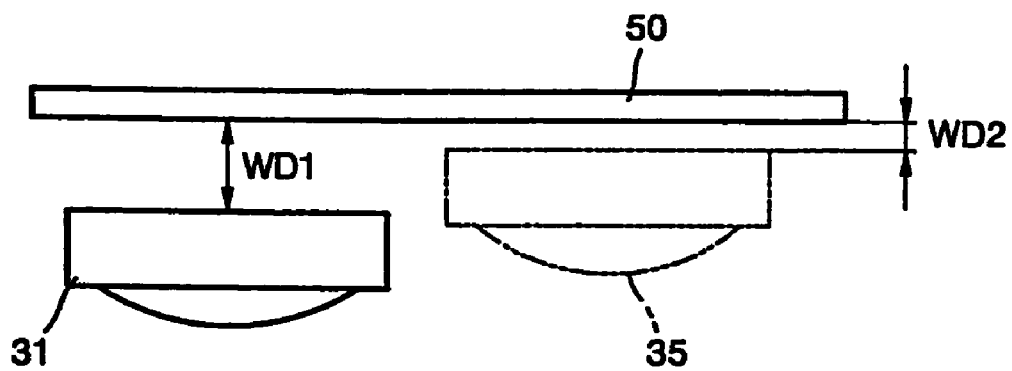
FIG. 6 illustrates a separation distance between an optical disc and two objective lenses when the two objective lenses having different working distances are installed in an existing actuator for an optical pickup.
Figure 7:
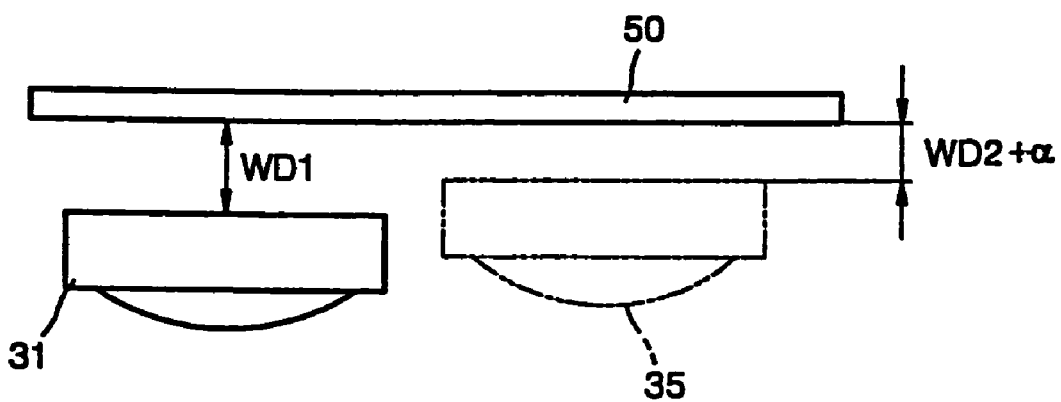
FIG. 7 illustrates a separation distance between an optical disc and two objective lenses when the two objective lenses having different working distances are installed in the actuator used with an optical pickup according to an embodiment of the present invention.

When a working distance of the first objective lens 31 for a low density optical disc installed in the first installation hole 21 is represented as WD1, and a working distance of the second objective lens 35 for a high density optical disc installed in the second installation hole 25 is represented as WD2, the first and second installation holes 21 and 25 should be provided so that the first and second objective lenses 31 and 35 can be installed to satisfy the following equation:

$$WD1 \geq WD2$$

separation distance with respect to optical disc of second objective lens$=WD2+\alpha$ Here, $\alpha=|WD1-WD2|\times(0.1\sim1.0)$.  Equation 1:

FIG. 6 illustrates a separation distance between an optical disc 50 and the first and second objective lenses 31 and 35 when the first and second objective lenses 31 and 35, having different working distances, are installed in an existing actuator for an optical pickup. FIG. 7 illustrates a separation distance between the optical disc 50 and the first and second objective lenses 31 and 35 when the first and second objective lenses 31 and 35, having different working distances, are installed in the bobbin 20 of the actuator used with an optical pickup according to an embodiment of the present invention. As seen from the comparison of FIG. 6 and FIG. 7, if the first and second installation holes 21 and 25 are formed so that the first and second objective lenses 31 and 35 can be installed while satisfying the above Equation 1, a basic separation distance between the second objective lens 35 and the optical disc 50 is WD2+α. Thus, contact (interference) between the second objective lens 35, having a shorter working distance, and the optical disc 50 can be prevented when the optical disc 50 is initially installed, and when the first objective lens 31 having a longer working distance operates.

Referring back to FIGS. 2 and 3, in the actuator used with an optical pickup according to an embodiment of the present invention, the magnetic circuit is divided into a first magnetic circuit 51 to drive the first and second objective lenses 31 and 35 in the focusing direction, and a second magnetic circuit 55 to drive the first and second objective lenses 31 and 35 in the tracking direction, thereby reducing the weight of the moving portion. Here, the first and second magnetic circuits 51 and 55 are installed at the same side of the bobbin 20 (preferably, at a side parallel with the direction R).

Here, in an optical pickup assembly when the first and second objective lenses 31 and 35 are installed in the bobbin 20 of the actuator according to an embodiment of the present invention, the moving portion includes the bobbin 20, the first and second objective lenses 31 and 35, and a magnetic circuit portion (preferably, focusing and tracking coils 53 and 57) installed in the bobbin 20.

The first magnetic circuit 51 comprises the focusing coil 53 and a focusing magnet 52. The focusing coil 53 is installed at both sides of the bobbin 20, parallel with the direction R, and the focusing magnet 52 is installed on the base 10 to be opposite to the focusing coil 53.

Figure 8:
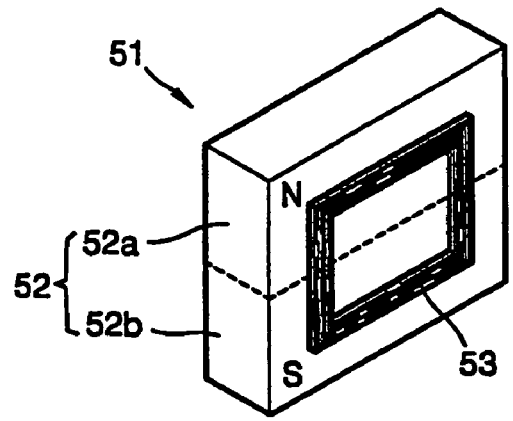
FIG. 8 is a schematic perspective view of a first magnetic circuit adopted in the actuator used with an optical pickup according to FIG. 2.
Figure 9A:
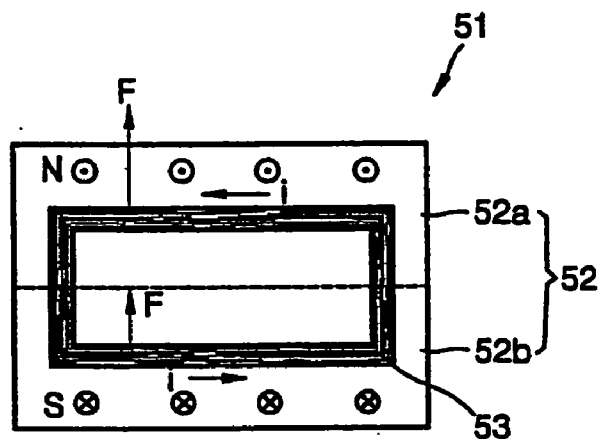
FIGS. 9A and 9B illustrate a principle of driving the bobbin in a focusing direction by the first magnetic circuit of FIG. 8.
Figure 9B:
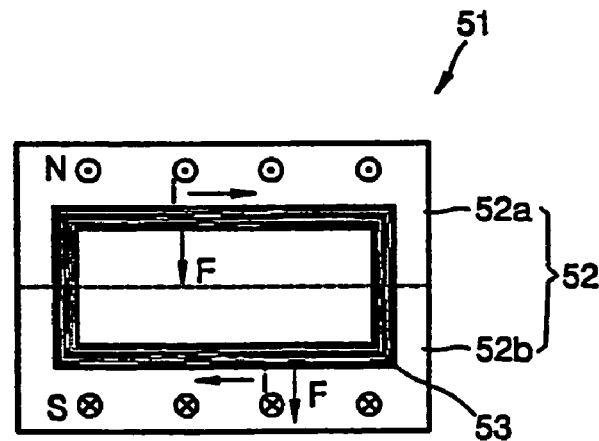

As illustrated in FIG. 8, the focusing magnet 52 is a two-pole magnetized polarization magnet, and the focusing coil 53 is formed in a rectangular shape in which long sides of the focusing coil 53 are put on the N-pole portion 52a and S-pole portion 52b of the focusing magnet 52. In this case, as illustrated in FIGS. 9A and 9B, portions corresponding to a pair of long sides of the focusing coil 53 are the effective focusing coil which contributes to generate an electromagnetic force. Likewise, when the portions corresponding to a pair of long sides of the focusing coil 53 having a rectangular shape act as an effective focusing coil, the overall length of the focusing coil 53 installed in the moving portion of the actuator can be reduced.

Here, as the N-pole portion 52a of the focusing magnet 52 is placed on the upper side of the S-pole portion 52b of the focusing magnet 52 and the magnetic field from the N-pole portion 52a protrudes from the paper, as illustrated in FIG. 9A, when current flows counterclockwise through the focusing coil 53, a force is applied in the upper direction of the portions corresponding to a pair of long sides of the focusing coil 53, according to Flemings' left hand rule. When the current flows clockwise through the focusing coil 53, as illustrated in FIG. 9B, the force is applied in the lower direction of the portions corresponding to a pair of long sides of the focusing coil 53. Thus, when the polarity and amount of the current flowing through the focusing coil 53 are adjusted, the position in the focusing direction of the first and second objective lenses 31 and 35 installed in the bobbin 20 can be controlled.

The second magnetic circuit 55 comprises the tracking coil 57 and a tracking magnet 56. In this case, the tracking coil 57 is installed at both sides of the bobbin 20, and the tracking magnet 56 is installed on the base 10 to be opposite to the tracking coil 57.

Figure 10:
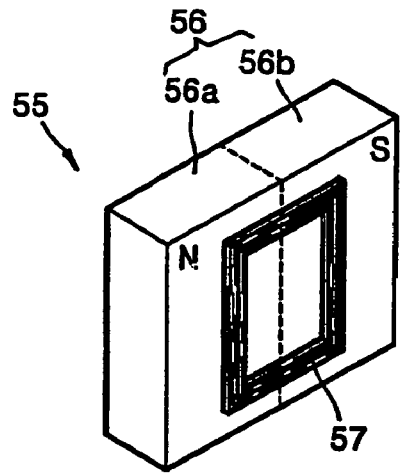
FIG. 10 is a schematic perspective view of a magnetic circuit adopted in the actuator used with an optical pickup of FIG. 2.
Figure 11A:
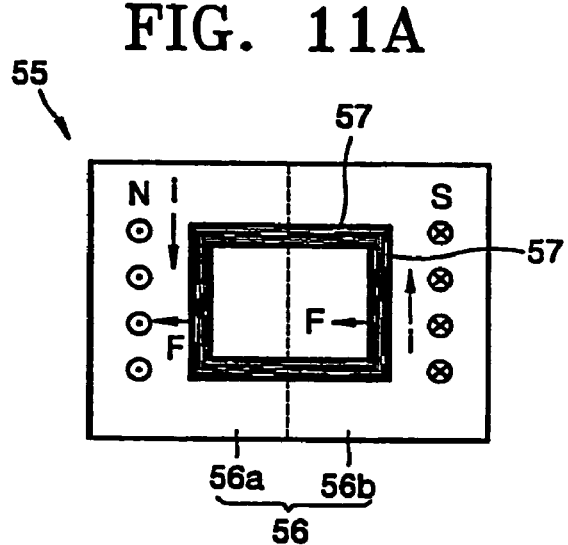
FIGS. 11A and 11B illustrate a principle of driving the bobbin in a focusing direction by the magnetic circuit of FIG. 10.
Figure 11B:
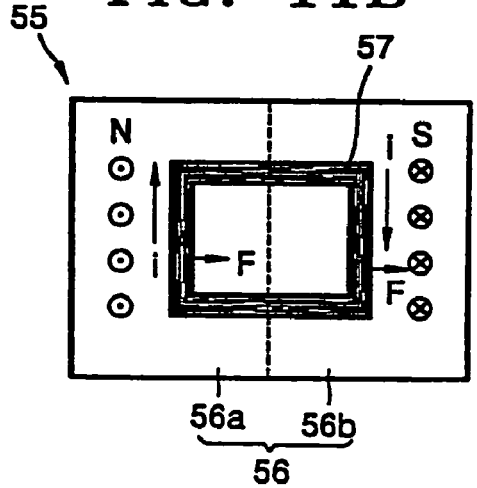

As illustrated in FIG. 10, the tracking magnet 56 is a two-pole magnetized polarization magnet in the direction R, and the tracking coil 57 is formed in a rectangular shape in which long sides of the tracking coil 57 are put on the N-pole portion 56a and S-pole portion 56b of the tracking magnet 56. In this case, as illustrated in FIGS. 11A and 11B, portions corresponding to a pair of long sides of the tracking coil 57 are the effective tracking coil which contributes to generate an electromagnetic force. Likewise, when the portions corresponding to a pair of long sides of the tracking coil 57 having a rectangular shape act as an effective focusing coil, the overall length of the tracking coil 57 installed in the moving portion of the actuator can be reduced.

Here, when the N-pole portion 56a of the tracking magnet 56 is placed on the left side of the S-pole portion 56b of the tracking magnet 56, and the magnetic field from the N-pole portion 56a protrudes from paper, as illustrated in FIG. 11A, when current flows counterclockwise through the tracking coil 57, the force is applied in the left direction of the portions corresponding to a pair of long sides of the tracking coil 57. When the current flows clockwise through the tracking coil 57, as illustrated in FIG. 11B, the force is applied in the right direction of the portions corresponding to a pair of long sides of the tracking coil 57. Thus, when the polarity and amount of the current flowing through the tracking coil 57 are adjusted, the position in the tracking direction of the first and second objective lenses 31 and 35 installed in the bobbin 20 can be controlled.

Figure 12:
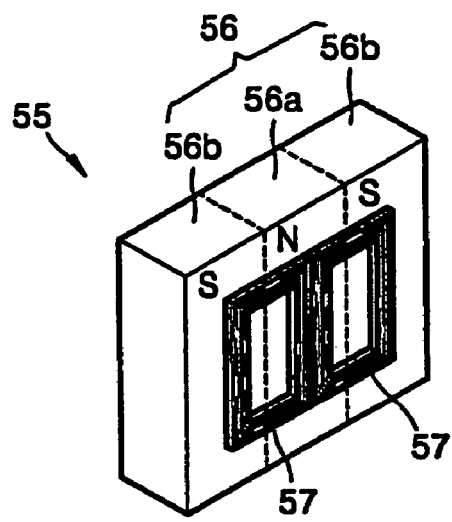
FIG. 12 is a schematic perspective view of another embodiment of the magnetic circuit of FIG. 10 adopted in the actuator used with an optical pickup according to FIG. 2.

Alternatively, as illustrated in FIG. 12, a three-pole magnetized polarization magnet in the direction R may be used as the tracking magnet 56. Two tracking coils 57 are provided so that both long sides of the tracking coils 57 are put on the N-pole portion 56a and S-pole portions 56b of the tracking magnet 56. Here, in the arrangement between the three-pole magnetized tracking magnet 56 and the two tracking coils 57, the direction of the force applied to the tracking coils 57 can be determined from FIGS. 11A and 11B according to the direction of the current flowing through the tracking coils 57, and thus detailed descriptions thereof will be omitted.

Consequently, since the magnetic circuit can increase the length of the effective focusing coil and the length of the effective tracking coil, the overall lengths of the focusing coil 53 and the tracking coil 57 can be reduced, and thus the weight of the moving portion of the actuator can be reduced.

The actuator used with an optical pickup according to this embodiment of the present invention further includes an internal yoke 58 and an external yoke 59 so that the intensity of an effective magnetic field to generate a driving force in the focusing direction can be increased by guiding a magnetic flux generated in the focusing magnet 52.

Figure 13:
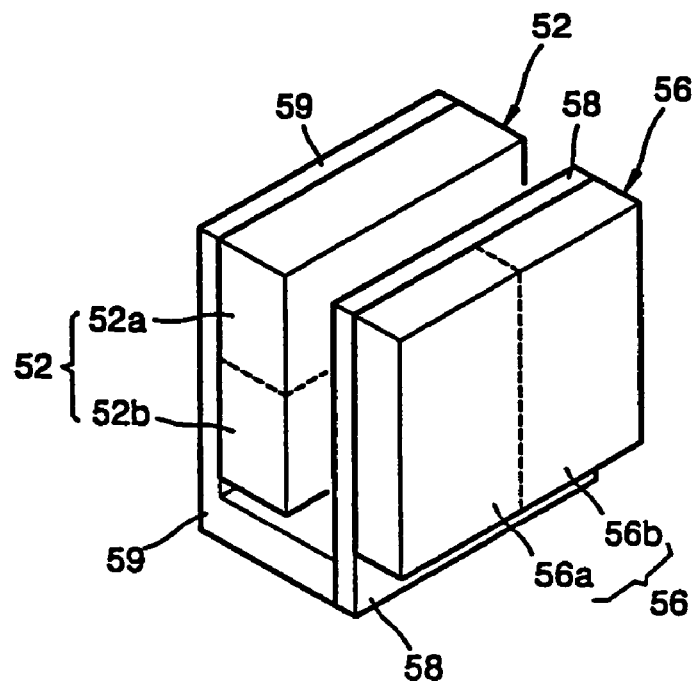
FIG. 13 is a perspective view of a focusing magnet and internal and external yokes to guide a magnetic flux generated by the focusing magnet illustrated in FIG. 2.

FIG. 13 is a perspective view of the focusing magnet 52 and internal and external yokes 58 and 59 to guide a magnetic flux generated in the focusing magnet 52 illustrated in FIG. 2. The internal and external yokes 58 and 59 may be formed monolithically of the same material as that of the base 10. Here, one of the internal and external yokes 58 and 59 may be included so as to guide the magnetic flux generated in the focusing magnet 52.

As described above, when the actuator used with an optical pickup according to this embodiment of the present invention further includes the internal and external yokes 58 and 59, the focusing magnet 52 is installed at one side facing the bobbin 20 of the external yoke 59, and the internal yoke 58 is located between the focusing coil 53 and the center of the bobbin 20. Thus, as illustrated in FIG. 4, an insertion hole 61, into which the internal yoke 58 is inserted, is further included in the bobbin 20.

As illustrated in FIGS. 2 and 13, the internal yoke 58 may be used as a mount for the tracking magnet 56 of the second magnetic circuit 55. In this case, the tracking magnet 56 is installed at a side facing the center of the bobbin 20 of the internal yoke 58. The tracking coil 57 is installed in the bobbin 20 to be opposite to the tracking magnet 56 in the insertion hole 61.

As described above, when the actuator used with an optical pickup according to this embodiment of the present invention includes the internal and external yokes 58 and 59, and the internal yoke 58 is used as a mount to install the tracking magnet 56, and the tracking coil 57 is arranged at a side toward the center of the bobbin 20 of the insertion hole 61, the insertion hole 61 has a size in which movement in the focusing and tracking directions of the bobbin 21 is not affected by the internal yoke 58, the tracking magnet 56, and the tracking coil 57 located in the insertion hole 61. Here, when the bobbin 20 largely deviates from a desired position, the bobbin 20 is suspended by the internal yoke 58 inserted in the insertion hole 61, and the movement of the bobbin 20 is limited, and thus the internal yoke 58 guides the movement of the bobbin 20.

As described with reference to FIGS. 2 and 13, if the intensity of the effective magnetic field is maximized while providing the internal and external yokes 58 and 59, and the focusing coil 53 is formed in a rectangular shape such that both long sides of focusing coil 53 are put on the N-pole and S-pole portions 52a and 52b of the focusing magnet 52 while providing a two-pole magnetized polarization magnet, i.e., the focusing magnet 52, the poles being disposed in the focusing direction, the length of the focusing coil 53 to generate a magnetic driving force of a desired size, and the corresponding occupied volume can be reduced. Also, if the tracking coil 57 is formed in a rectangular shape such that both long sides of the tracking coil 57 are put on the N-pole and S-pole portions 56a and 56b of the tracking magnet 56 while providing a two-pole or three-pole magnetized polarization magnet, the poles being disposed in the direction R, the length of the tracking coil 57 to generate a magnetic driving force of a desired size, and the corresponding occupied volume can be reduced. Consequently, the weight of the moving portion can be reduced greatly by the structure of the magnetic circuit using the polarization magnets as the focusing and tracking magnets 52 and 56.

In the actuator used with an optical pickup according to the embodiments of the present invention, since the two objective lenses 31 and 35 are installed in the bobbin 20, the weight of the objective lenses 31 and 35 installed in the bobbin 20 is increased compared with an existing actuator in which one objective lens is installed in one bobbin. However, in the actuator used with an optical pickup according to the embodiments of the present invention, since the magnetic circuit is divided into the first magnetic circuit 51 to move the magnetic circuit in the focusing direction and the second magnetic circuit 55 to move the magnetic circuit in the tracking direction, and the polarization magnets provide the focusing and tracking magnets 52 and 56, the weight of the magnetic circuit (in particular, the focusing coil 53 and the tracking coil 57) installed in the moving portion of the actuator can be reduced as compared with the existing actuator, and moreover, the electromagnetic force to move in the focusing and tracking directions is greater than that of an existing actuator. Even though the moving portion of the actuator used with an optical pickup according to the embodiments of the present invention is heavier than that of an existing actuator in which only one objective lens is installed in the bobbin, reduction in sensitivity can be prevented. Also, the weight of the moving portion of the actuator used with an optical pickup according to the embodiments of the present invention may be not heavier than that of the existing actuator in which only one objective lens is installed in the bobbin.

Although the actuator used with an optical pickup according to the embodiments of the present invention is described and illustrated as a structure in which the two objective lenses 31 and 35 having different working distances are installed in one bobbin 20, this is only an example, and the present invention is not limited thereto. That is, the actuator used with an optical pickup according to the embodiments of the present invention has a structure in which two or more objective lenses are installed in one bobbin, and thus can be adopted in the optical pickup such that two or three or more kinds of optical discs having different recording densities, such as CDs, DVDs, and HD-DVDs can be compatible with and recorded and/or reproduced.

The optical pickup in which the above-mentioned actuator according to the embodiments of the present invention can be adopted may have a structure in which an optical system to record and/or reproduce high density optical discs, such as HD-DVD, and an optical system to record and/or reproduce low density optical discs, such as DVDs (and additionally, CDs), are separately included. Specific examples of an optical structure of the optical pickup adopting the actuator according to the embodiments of the present invention can be understood by people skilled in the art, and thus detailed descriptions and illustrations of specific examples of the optical structure of the optical pickup adopting the actuator according to the embodiments of the present invention will be omitted.

Hereinafter, the operation of an optical disc drive in which the actuator used with an optical pickup according to an embodiment of the present invention is adopted will be described.

If the optical disc is inserted into the optical disc drive, the type of optical disc is determined by a photodetector installed in the optical pickup or a separate detection device. The type of optical discs is discriminated according to a recording density.

When the discrimination of the type of the optical disc is completed, focusing and tracking servos for an objective lens corresponding to the type of the optical disc sequentially operate. That is, if the inserted optical disc is a high density optical disc (for example, a HD-DVD), the focusing and tracking servos operate such that the objective lenses, arranged in an inner diameter of the bobbin, are located in a proper position of the optical disc. Also, if the inserted optical disc is a low density optical disc (for example, a DVD or CD), the focusing and tracking servos operate such that the objective lenses, arranged in an outer diameter of the bobbin, are located in a proper position of the optical disc.

Here, the focusing and tracking servos refer to focusing and tracking error signals detected by the photodetector installed in the optical pickup, allowing current to flow through the focusing and tracking coils attached to the moving portion of the actuator, thereby generating the displacement of the moving portion. When the current flows through the focusing and tracking coils, an electromagnetic force is generated by the interaction between the current flowing through the focusing and tracking coils and the magnetic flux generated in the focusing magnet and the tracking magnet such that the bobbin is moved in the focusing and tracking directions.

As described above, the actuator used with an optical pickup according to the embodiments of the present invention has a structure in which two objective lenses are installed in one bobbin, and a device required to rotate the objective lenses simultaneously by a predetermined angle with respect to the rotation axis, unlike with a conventional actuator to present an axis perturbation type, is not required, and thus the entire structure of the actuator is simplified.

Also, the actuator used with an optical pickup according to the embodiments of the present invention has a structure in which a magnetic circuit to adjust the bobbin in the tracking direction, and a magnetic circuit to adjust the bobbin in the focusing direction are divided, and thus the weight of the moving portion of the actuator can be reduced, and high sensitivity can be achieved.

Further, the objective lens for a high density optical disc, having a shorter working distance, is installed in the bobbin satisfying Equation 1 supra, and thus interference between the objective lens for a high density disc and the optical disc can be prevented when the high density optical disc is initially installed or a low density optical disc is installed.

Furthermore, the actuator used with an optical pickup according to the embodiments of the present invention has a structure in which the objective lens, having a longer working distance, is installed at a deeper position from the upper side of the bobbin than the objective lens having a shorter working distance, and thus can contribute to make the optical pickup thinner.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator used with an optical pickup, the actuator comprising:
   a lens holder having a plurality of installation holes supporting a plurality of objective lenses to record and/or reproduce data on optical discs having different recording densities; and
   a magnetic circuit which drives the lens holder in focusing and tracking directions,
   the magnetic circuit being divided into first magnetic circuits located at opposite sides of the lens holder to drive the objective lenses in the focusing direction, and second magnetic circuits located at opposite sides of the lens holder to drive the objective lenses in the tracking direction, wherein each of the first magnetic circuits comprises a focusing coil and a focusing magnet and each of the second magnetic circuits comprises a tracking coil and a tracking magnet;
   wherein the tracking magnets and the tracking coils of the second magnetic circuits are arranged closer to a center of the lens holder than the focusing coils and the focusing magnets of the first magnetic circuits.

2. The actuator of claim 1, wherein the plurality of installation holes are arranged in a direction corresponding to the direction of a radius of the optical discs.

3. The actuator of claim 1, wherein the focusing magnet is a two-pole magnetized polarization magnet, the poles being disposed in the focusing direction, and the focusing coil corresponds to the focusing magnet.

4. The actuator of claim 3, wherein the focusing coil is of a rectangular shape in which both long sides of the focusing coil are positioned to contribute to generation of an electromagnetic force.

5. The actuator of claim 1, wherein the tracking magnet is a two-pole magnetized polarization magnet, the poles being disposed in the tracking direction, and the tracking coil corresponds to the tracking magnet.

6. The actuator of claim 5, wherein the tracking coil is of a rectangular shape in which both long sides of the tracking coil are positioned to contribute to generation of an electromagnetic force.

7. The actuator of claim 1, wherein the tracking magnet is a three-pole magnetized polarization magnet, the poles being disposed in the tracking direction, and two tracking coils corresponding to the tracking magnet.

8. The actuator of claim 7, wherein the tracking coils are of a rectangular shape in which both long sides of the tracking coils are positioned to contribute to generation of an electromagnetic force.

9. The actuator of claim 1, wherein the first magnetic circuits further include at least one yoke of an internal yoke and an external yoke to guide magnetic flux generated in the focusing magnet.

10. The actuator of claim 9, wherein the internal yoke is used as a mount to install the tracking magnet.

11. The actuator of claim 1, wherein the plurality of installation holes include a first installation hole in which a first objective lens for at least one type of low density optical disc is installed, and a second installation hole in which a second objective lens for a high density optical disc is installed.

12. The actuator of claim 11, wherein the second installation hole is located in a more inner diameter of the optical disc than the first installation hole.

13. The actuator of claim 12, wherein the low density optical disc is at least one selected from a CD-family optical disc and a DVD-family optical disc, and the high density optical disc has a higher density than the DVD-family optical disc.

14. An actuator used with an optical pickup, the actuator comprising:
    a lens holder having a plurality of installation holes supporting a plurality of objective lenses to record and/or reproduce data on optical discs having different recording densities; and
    first and second magnetic circuits located adjacent to the lens holder to drive the lens holder in a tracking direction, and third and fourth magnetic circuits, located adjacent to the first and second magnetic circuits, respectively to drive the lens holder in a focusing direction, wherein the first and second magnetic circuits each include a tracking magnet and a tracking coil and each of the third and fourth magnetic circuits each include a focusing magnet and a focusing coil wherein the tracking magnets and the tracking coils of the first and second magnetic circuits are arranged closer to a center of the lens holder than the focusing coils and the focusing magnets of the third and fourth magnetic circuits.

* * * * *